United States Patent [19]
Aoki et al.

[11] Patent Number: 5,720,831
[45] Date of Patent: Feb. 24, 1998

[54] TREAD OF HEAVY DUTY PNEUMATIC RADIAL TIRE

[75] Inventors: Yasutoshi Aoki, Kadaira; Yasutaka Enoki, Sayama, both of Japan

[73] Assignee: Bridgestone Corporation, Tokyo, Japan

[21] Appl. No.: 844,980

[22] Filed: Mar. 2, 1992

Related U.S. Application Data

[63] Continuation of Ser. No. 598,030, Oct. 16, 1990, abandoned.

[30] Foreign Application Priority Data

Oct. 23, 1989 [JP] Japan .................. 1-275595
Aug. 10, 1990 [JP] Japan .................. 2-212448

[51] Int. Cl.$^6$ .................................. B60C 101/00
[52] U.S. Cl. .................................. 152/209 R
[58] Field of Search ................ 152/209 R, 209 D

[56] References Cited

U.S. PATENT DOCUMENTS

| | | | |
|---|---|---|---|
| 3,157,218 | 11/1964 | Brown | 152/209 R |
| 3,411,559 | 11/1968 | Verdier | 152/209 R |
| 3,759,306 | 9/1973 | Gruner et al. | 152/209 R |
| 3,830,275 | 8/1974 | Russell | 152/209 R |
| 4,200,134 | 4/1980 | Takigawa et al. | 152/209 R |
| 4,214,618 | 7/1980 | Takigawa et al. | 152/209 R |
| 4,480,671 | 11/1984 | Giron | 152/209 R |
| 4,724,878 | 2/1988 | Kabe et al. | |

FOREIGN PATENT DOCUMENTS

| | | | |
|---|---|---|---|
| 0209125 | 1/1987 | European Pat. Off. | |
| 0256247 | 2/1988 | European Pat. Off. | |
| 0280847 | 9/1988 | European Pat. Off. | |
| 0285695 | 10/1988 | European Pat. Off. | |
| 0313361 | 4/1989 | European Pat. Off. | |
| 0194104 | 11/1982 | Japan | 152/209 R |
| 0128904 | 8/1983 | Japan | 152/209 R |
| 0059504 | 4/1984 | Japan | 152/209 R |
| 0064503 | 4/1986 | Japan | 152/209 R |
| 0295103 | 12/1986 | Japan | 152/209 R |
| 0106112 | 5/1988 | Japan | 152/209 R |
| 0232007 | 9/1988 | Japan | 152/209 R |
| 0240403 | 10/1988 | Japan | 152/209 D |
| 2088311 | 3/1990 | Japan | 152/209 R |
| 2-169305 | 6/1990 | Japan. | |
| 2190048 | 11/1987 | United Kingdom | 152/209 R |

*Primary Examiner*—Geoffrey L. Knable
*Attorney, Agent, or Firm*—Oliff & Berridge, P.L.C.

[57] ABSTRACT

A tread of a heavy-duty pneumatic radial tire comprises a pair of upper and lower rubber layers having mutually different moduli of elasticity and a small-width groove formed in the upper rubber layer in such manner as to be substantially continuous in a circumferential direction of the tire. The dimension between a boundary surface bordering the two rubber layers and a bottom of the groove is set to be 1 mm or more. Accordingly, the arrangement prevents the occurrence of cracks due to a deforming stress acting in the groove bottom occurring when the tire rolls or rides on a curbstone.

19 Claims, 5 Drawing Sheets

TREAD OF HEAVY DUTY PNEUMATIC RADIAL TIRE

This is a Continuation of application Ser. No. 07/598,030 filed Oct. 16, 1990, now abandoned.

BACKGROUND OF THE INVENTION

1. Field of the Invention

The present invention relates to a tread of a heavy-duty pneumatic radial tire and, more particularly, to a tread of a heavy-duty pneumatic radial tire wherein a pair of upper and lower rubber layers having mutually different moduli of elasticity are laminated.

2. Description of the Related Art

In a conventionally known tread of a heavy-duty pneumatic radial tire, a pair of upper and lower rubber layers having mutually different moduli of elasticity are laminated.

A known example of this two-layer laminated structure is arranged such that a wear-resistant rubber layer is disposed as the upper layer on the tread surface side, and a heat-resistant rubber layer is disposed as the lower layer. Through this arrangement, an attempt is made to make the wear resistance and heat resistance compatible.

At the same time, when compared with bias tires, heavy-duty pneumatic radial tires excel in durability and wear resistance, but are more likely to be subjected to irregular wear, including shoulder wear in which shoulder portions of the tread are worn off earlier than other portions and railway wear in which portions in the proximity of main grooves are worn off earlier along the main grooves than other portions. In addition, when the tires run on ruts formed in a road surface, there is a drawback in that a steering wheel tends to be controlled by the wheels, i.e., the so-called wandering characteristic is poor. Accordingly, in order to overcome these drawbacks encountered with heavy-duty pneumatic radial tires, various improvements on tread patterns have been proposed such as U.S. Pat. Nos. 3,411,559, 4,200,134, 4,214,618, and 4,480,671, and Japanese Patent Application Laid-Open No. 2-169305. All of the tread patterns disclosed therein have a common feature in that they are provided with fine grooves extending in the circumferential direction of the tire.

However, with these treads having fine grooves extending in the circumferential direction so as to overcome the irregular wear and improve the wandering characteristic, etc., there have been cases where cracks occur from the bottom of the fine groove. Accordingly, the present inventors have investigated into the cause of these cracks, and found that they are liable to occur particularly in treads comprising a pair of upper and lower rubber layers having mutually different moduli of elasticity.

SUMMARY OF THE INVENTION

Accordingly, the present invention has been devised in view of the above-described circumstances and has as its object to provide a tread of a heavy-duty pneumatic radial tire capable of simultaneously satisfying the antinomic properties of wear resistance and heat resistance due to being laminated with a pair of upper and lower rubber layers having mutually different moduli of elasticity.

Another object of the present invention is to provide a tread of a heavy-duty pneumatic radial tire capable of sufficiently maintaining the effect of fine grooves that extend in the circumferential direction of the tire so as to mitigate irregular wear peculiar to the heavy-duty pneumatic radial tire and improve a wandering characteristic peculiar thereto.

To these ends, in accordance with the present invention, there is provided a tread of a heavy-duty pneumatic radial tire wherein a pair of upper and lower rubber layers having mutually different moduli of elasticity are laminated, comprising: a narrow-width fine groove extending in the rubber layer of the pair of upper and lower rubber layers which is located on a tread surface side, along a circumferential direction of the tire, a radius of curvature of a bottom of the fine groove being 1.5 mm or less, wherein a shortest distance between the bottom of the fine groove and a boundary surface bordering the pair of upper and lower rubber layers is set to be 1 mm or more.

In cases where the tread of a heavy-duty pneumatic radial tire wherein a pair of upper and lower rubber layers having mutually different moduli of elasticity are laminated is used, deforming stress is concentrated in a boundary surface bordering the two rubber layers as the tire rolls normally or rides on a curbstone. Furthermore, if such a tread is provided with a fine groove extending in the upper layer along a circumferential direction of the tire with a radius of curvature of a bottom of the fine groove being 1.5 mm or less, the deforming stress concentrated in the boundary surface affects the bottom of the fine groove, causing cracks to occur from the groove bottom. Accordingly, in the present invention, since the shortest distance between the groove bottom and the boundary surface is set to be 1 mm or more, the concentration of stress at the groove bottom is mitigated, thereby controlling the occurrence of cracks from the groove bottom.

By virtue of this arrangement, in accordance with the tread of the invention, it is possible to simultaneously satisfy, for instance, the antinomic properties of wear resistance and heat resistance due to being laminated with the pair of upper and lower rubber layers having mutually different moduli of elasticity. Furthermore, it is possible to sufficiently maintain the effect of the fine grooves that extend in the circumferential direction of the tire so as to mitigate irregular wear peculiar to the heavy-duty pneumatic radial tire and improve a wandering characteristic peculiar thereto.

In addition, in accordance with one aspect of the invention, one fine groove is provided within a range of 3–10% of a tread width, the range extending from a tread end.

In accordance with another aspect of the invention, the tread of a heavy-duty pneumatic radial tire further comprises plural main grooves extending in the rubber layer of the pair of upper and lower rubber layers which is located on the tread surface side of the tire, along the circumferential direction of the tire, the fine groove being provided along a land portion disposed in the proximity of a groove wall of each of the main grooves, and an independent land area formed between each of the main grooves and the fine groove associated therewith.

In still another aspect of the invention, the tire of a heavy-duty pneumatic radial tire further comprises plural main grooves extending in the rubber layer of the pair of upper and lower rubber layers which is located on the tread surface side of the tire, along the circumferential direction of the tire, a pair of fine grooves provided in a land portion defined by adjacent ones of the main grooves, and an independent land area formed between the pair of fine grooves.

The above and other objects, features and advantages of the present invention will become more apparent from the following detailed description of the invention when read in conjunction with the accompanying drawings.

DESCRIPTION OF THE PREFERRED EMBODIMENTS

Figure 1:
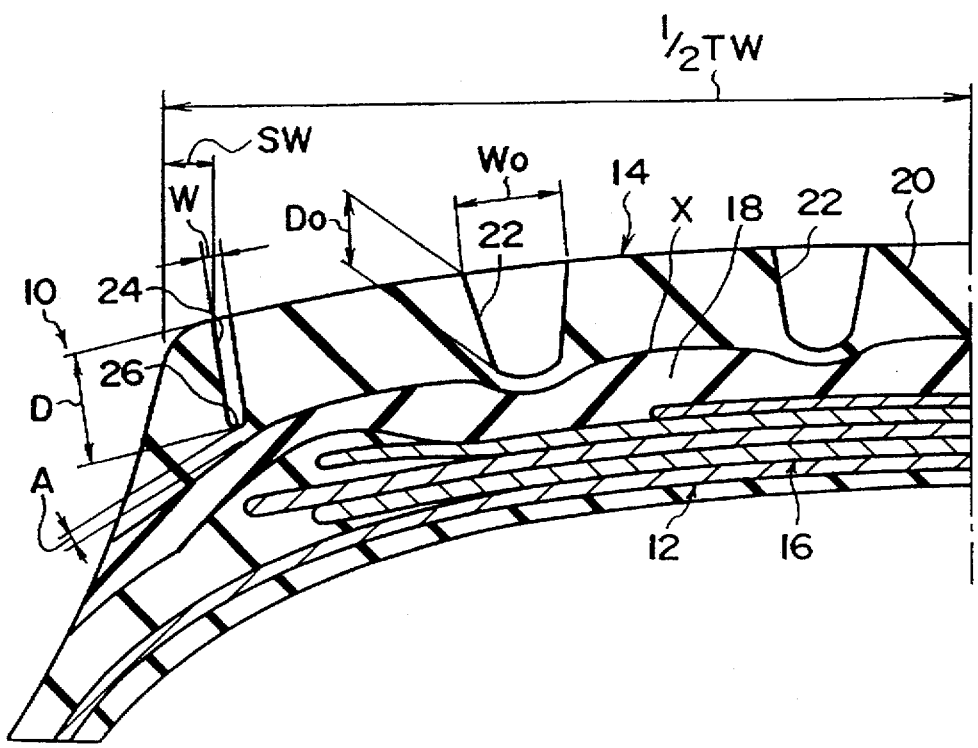
FIG. 1 is an enlarged cross-sectional view taken along the axial direction of a tire, illustrating a structure of a tread portion of a heavy-duty pneumatic radial tire in accordance with a first embodiment of the present invention.

FIG. 1 illustrates a tire 10 in accordance with a first embodiment of the present invention. The size of the tire 10 is "285/75R24.5".

The tire 10 comprises a carcass 12 constituted by a rubberized cord layer and has a so-called radial structure in which its cord angle is formed substantially 90° with respect to the circumferential direction of the tire.

A tread portion 14 has a sufficient thickness to withstand wear and external damage. Plural belt layers 16 are interposed between the carcass 12 and the tread portion 14. Each of the belt layers 16 is constituted by multiple cords which are parallel with each other and have fixed angles with respect to the equatorial plane of the tire. At least two of these belt layers 16 are disposed in such a manner that their cord angles intersect each other.

The tread portion 14 is formed of two rubber layers 18, 20. The lower rubber layer 18 has a heat-resistant property. Meanwhile, the upper rubber layer 20 on the tread surface side has a wear-resistant property. In this embodiment, as for the rubber layer 18, its modulus of 300% elasticity at room temperature is 150 kg/cm². As for the rubber layer 20, its modulus of 300% elasticity at room temperature is 100 kg/cm².

The proportions of the upper and lower layers in the entire tread, respectively vary depending on characteristics required for the heavy-load tire to which the tread is applied. However, the proportion of the lower layer in the entire tread is preferably 30–50%. The reason for this is that if it exceeds 50%, wear resistance deteriorates, and if it is lower than 30%, the heat resistance is adversely affected.

A predetermined tread pattern is formed on the tread portion 14. This tread pattern employs a rib pattern in which four main grooves 22 are formed in such a manner as to be continuous in the circumferential direction of the tire.

A small-width groove (fine groove) 24 is formed on each shoulder side located axially outwardly of each axially outermost one of the main grooves 22. It should be noted that, as used herein and in the claims, the terms "axial" and "axially" refer to directions which are parallel to the axis of rotation of the tire. These small-width grooves 24 are also formed in such a manner as to be continuous in the circumferential direction of the tire. A width SW ranging from a shoulder-side inner wall surface of the fine groove 24 to a road-surface contacting end of the shoulder portion of the tire 10 is set to be within 3–10% (in this embodiment, SW=8 mm) of a ground-contacting total width TW of the tire 10 (in this embodiment, TW=220 mm). In addition, a width W of the fine groove 24 (in this embodiment, W=2.5 mm) is set to be 15–30% of a width $W_0$ of the main groove 22 (in this embodiment $W_0$=14 mm). Namely, $$0.15W_0 \leq W \leq 0.30W_0 \quad (1)$$

In addition, a depth D of the fine groove 24 (in this embodiment, D=15.2 mm) is set to be equal to or smaller than a depth $D_0$ of the main groove 22 and equal to or greater than 60% thereof (in this embodiment $D_0$=15.2 mm). Namely, $$D_0 \geq D \geq 0.60 D_0 \quad (2)$$

In addition, a radius of curvature R of a bottom of the fine groove 24 is set to be not more than 1.5 mm.

The reason for restricting the depth of the fine groove 24 to the aforementioned range is that if it is less than $0.60D_0$, it is impossible to expect a sufficient effect of the aforementioned fine grooves 24.

An interval A between the bottom 26 of the fine groove 24 and a boundary surface X bordering the two types of rubber layers 18, 20 of the tread portion in accordance with this embodiment is set to be 2 mm. This interval A is preferably 1 mm or more, and by securing this interval A, the occurrence of cracks from the bottom 26 of the fine groove 24 is controlled.

It should be noted that the configuration of each of the fine grooves 24 may be rectilinear, zigzag, or wavy along the circumferential direction of the tire. In addition, a plurality of fine grooves may be provided on each shoulder side of the tire.

A description will now be given of the operation of this embodiment.

As the tire 10 rolls, heat is generated therein. However, since heat-resistant rubber is used for the lower rubber layer 18 of the tread portion 14, heat separation durability can be maintained. If the heat-resistant rubber is used up to the ground contacting surface of the tire 10, the heat-resistant rubber is inferior in wear resistance.

In the tire 10 of this embodiment, since the wear-resistant rubber layer 20 is laminated as the upper layer of the tread portion 14, heat resistance can be maintained, and the wear resistance of the tread portion 14 can be improved. In addition, in this embodiment, since the fine grooves 24 are provided in the proximity of the respective shoulder portions along the circumferential direction of the tire, the irregular wear occurring at the shoulder portions can be made to concentrate in a land portion located axially outwardly of the fine groove 24, thereby preventing the irregular wear from reaching a center portion of the tread portion.

In addition, deforming stress is concentrated at the boundary surface X bordering the two types of rubber layers 18, 20 of the tread portion as the tire rolls normally and rides on a curbstone. Accordingly, if the distance between the boundary surface X and the bottom 26 of the fine groove 24 is short, cracks occur in the bottom 26 owing to the effect of the concentration of the stress. For this reason, it is preferable to space the boundary surface from the bottom 26 of the fine groove 24 as far apart as possible, so that, in this embodiment, the interval A between the bottom 26 of the fine groove 24 and the boundary surface X bordering the rubber layers 18, 20 of the tread portion 14 is set to be 2 mm. Consequently, the deforming stress acting in the bottom 26 of the fine groove 24 can be reduced, thereby virtually preventing the occurrence of cracks in the bottom 26.

The following table shows the results of a curbstone riding-on test using an actual vehicle, in which the length of cracks occurring in the circumferential groove bottom with respect to varying intervals A between the bottom 26 of the fine groove 24 and the boundary surface X was averaged, and a comparison was made between a prior art example and this embodiment.

| Interval A | Average length of cracks in the circumferential groove bottom |
| --- | --- |
| 0.5 mm (prior art) | 4.0 mm |
| 1.0 mm | 1.5 mm |
| 2.0 mm | 0 mm |
| 3.0 mm | 0 mm |

As shown in the table, if the aforementioned interval is set to 1 mm or more, it is possible to substantially overcome the occurrence of cracks. In the case of normal running, even if the interval is 1 mm, no problem is presented. In particular, if the interval is set to 2 mm or more, the occurrence of cracks can be suppressed. It should be noted that in cases where the interval exceeds 3 mm, no cracks occur in the bottom 26 of the groove 24, but in this case it becomes necessary to increase the thickness of the upper rubber layer 20 in order to secure the depth of the fine groove 24. Hence, in view of other aspects of durability including heat resistance, 2 mm is preferable as the interval.

Figure 2:
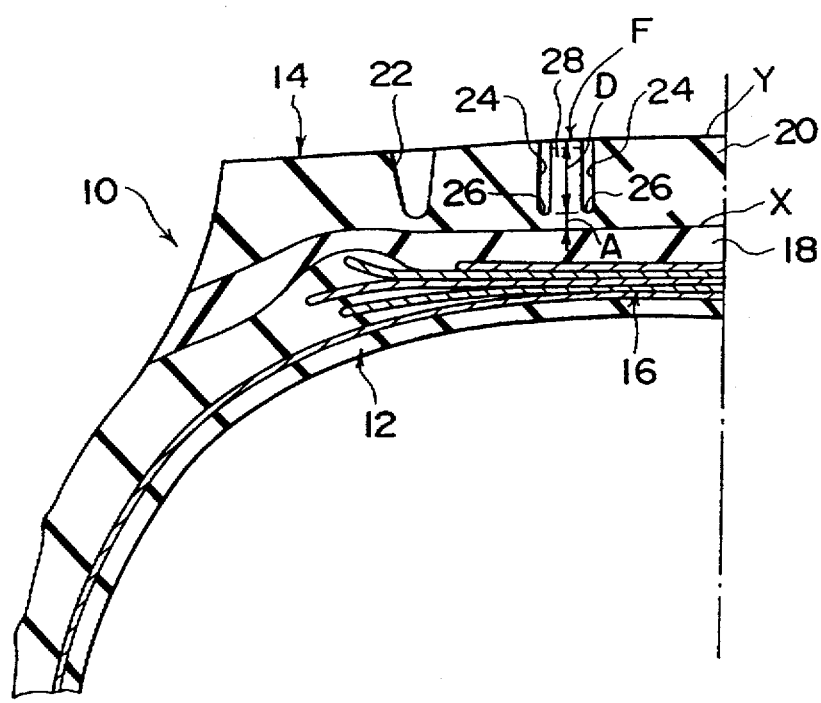
FIG. 2 is an enlarged cross-sectional view taken along the axial direction of the tire, illustrating a structure of a tread portion of a heavy-duty pneumatic radial tire in accordance with a second embodiment of the present invention.

Referring now to FIG. 2, a description will be given of a second embodiment of the present invention.

It should be noted that those components and portions that are identical to those of the first embodiment are denoted by the same reference numerals, and a description thereof will be omitted.

As shown in FIG. 2, in this embodiment, an independent land area 28 defined by a pair of fine grooves 24 is provided on the equatorial plane side of the tread portion 14. In addition, the dimension A between the bottom 26 of the fine groove 24 and the boundary surface X bordering the two types of rubber layers 18, 20 of the tread portion 14 in accordance with this embodiment is set to be 2 mm in the same way as the first embodiment.

Accordingly, in this embodiment, since the dimension A between the bottom 26 of the fine groove 24 and the boundary surface X bordering the two types of rubber layers 18, 20 is set to be 2 mm, the deforming stress acting in the bottom 26 of the fine groove 24 can be reduced, thereby virtually preventing the occurrence of cracks in the groove bottom 26. In addition, as the tire rolls under a load, a negative shearing force is produced in the independent land area 28, and the independent land area 28 is consequently worn, undergoing irregular wear which would otherwise occur in the tread portion 14. As a result, the effect of controlling irregular wear can be maintained.

Figure 3:
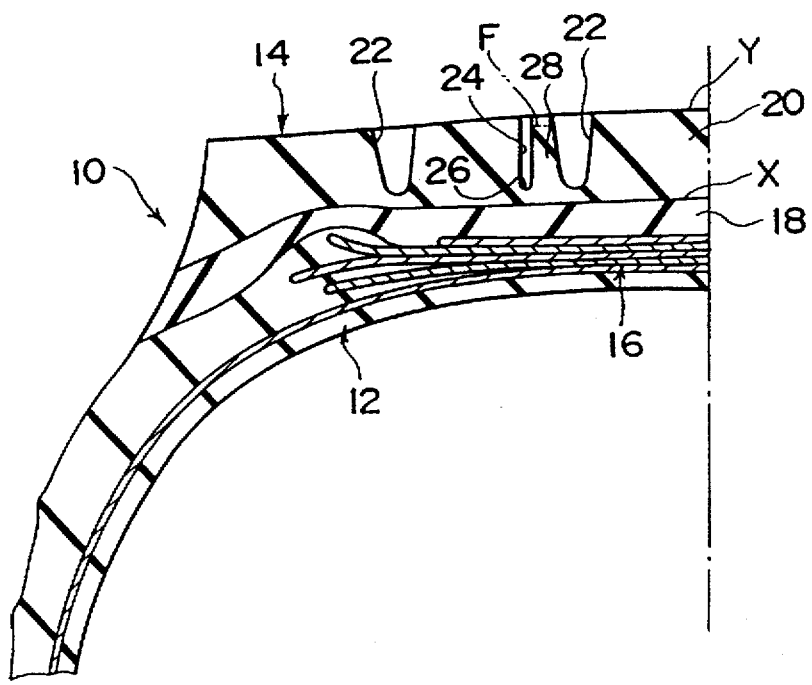
FIGS. 3–5 are enlarged cross-sectional views taken along the axial direction of the tire, illustrating structures of a tread portion of a heavy-duty pneumatic radial tire in accordance with other embodiments of the present invention.
Figure 4:
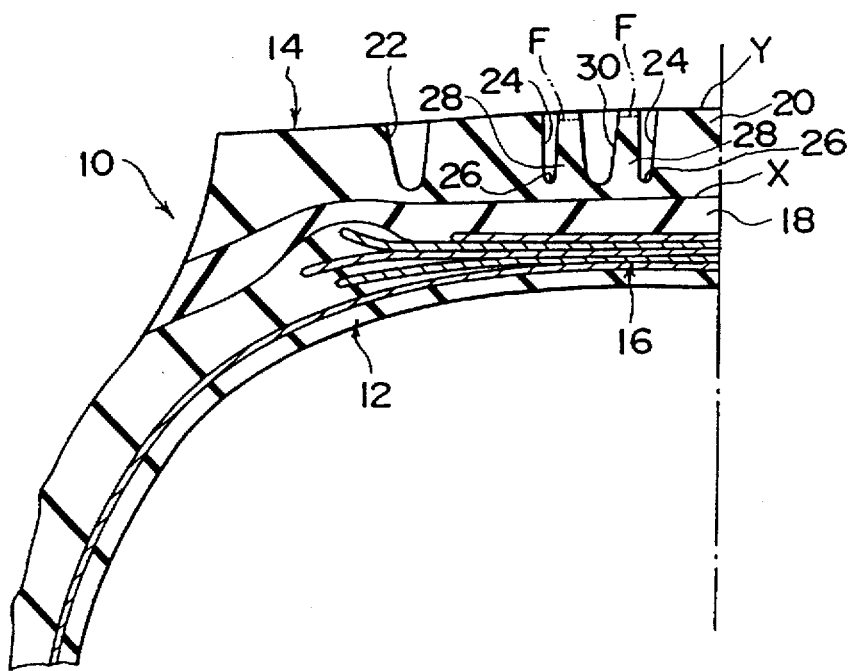
Figure 5:
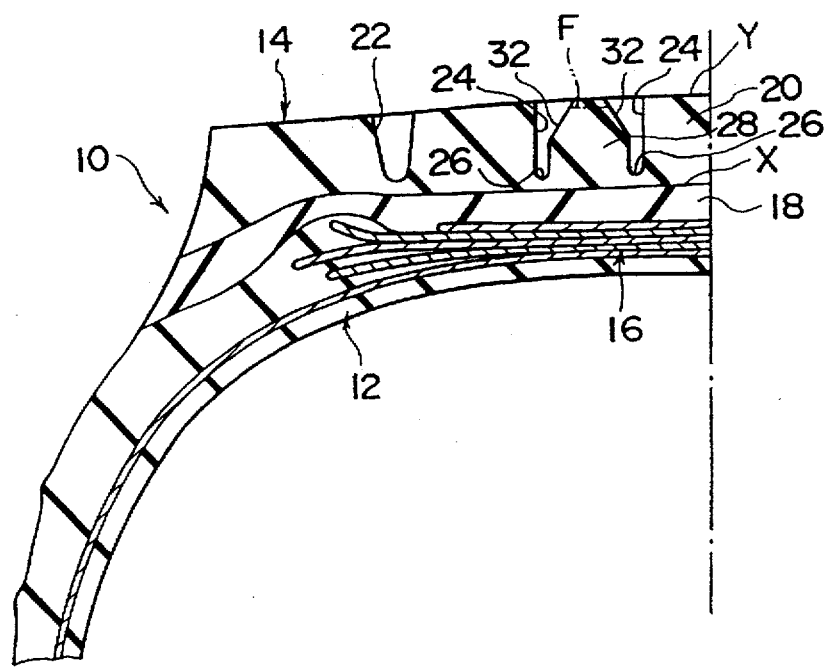

As shown in FIG. 3, the independent land area 28 may be defined by the fine groove 24 and the main groove 22, or, as shown in FIG. 4, a groove 30 may be formed in a central portion of the independent land area 28 in such a manner as to be continuous in the circumferential direction of the tire. Furthermore, as shown in FIG. 5, a taper 32 may be provided in an upper portion of a side wall portion 28A of the independent land area 28. Moreover, although not shown, multiple sipes may be provided transversely in the independent land area 28. Alternatively, as shown by a two-dotted chain line F in FIGS. 2–5, the independent land area 28 may be stepped down relative to a cross-sectional contour line Y of the tread portion 14. Thus, by providing sipes or a stepped-down configuration, the negative shearing force resulting from the rolling of the tire becomes large, thereby making it possible to enhance the effect of controlling irregular wear.

As described above, the tread of a heavy-duty pneumatic radial tire offers an outstanding advantage in that it is possible to sufficiently maintain the effect of the fine grooves that extend in the circumferential direction of the tire so as to mitigate irregular wear peculiar to the heavy-duty pneumatic radial tire and improve a wandering characteristic peculiar thereto. Simultaneously the tire satisfies, for instance, the antinomic properties of wear resistance and heat resistance due to being laminated with the pair of upper and lower rubber layers having mutually different moduli of elasticity.

What is claimed is:

1. A heavy-duty pneumatic radial tire comprising a tread wherein a pair of upper and lower rubber layers having mutually different moduli of 300% elasticity at room temperature are laminated, said upper rubber layer being located on a tread surface side of said tire and having a smaller modulus of 300% elasticity at room temperature than said lower rubber layer, said tread comprising:

plural main grooves extending in said one rubber layer located on said tread surface side of said tire, along the circumferential direction of said tire, and defining land portions adjacent a groove wall of each of said main grooves, a narrow-width fine groove extending in said one of said pair of upper and lower rubber layers which is located on a tread surface side of said tire, along a circumferential direction of said tire, a radius of curvature of a bottom of said fine groove being 1.5 mm or less and a width of said fine groove being set in a range of not less than 15% and not more than 30% of a width of one of said main grooves, wherein a shortest distance between said bottom of said fine groove and a boundary surface bordering between said pair of upper and lower rubber layers is set to be within a range of 1 mm and 3 mm.

2. A heavy-duty pneumatic radial tire according to claim 1, wherein one said fine groove is provided within a range of 3–10% of a tread width, said range extending from a tread end.

3. A heavy-duty pneumatic radial tire according to claim 1, wherein said fine groove is provided along one of said land portions, and defines an independent land area between said fine groove and said main groove associated therewith.

4. A heavy-duty pneumatic radial tire according to claim 1, wherein said plural main grooves define at least one land portion therebetween, a pair of fine grooves provided in at least one land portion, and an independent land area formed between said pair of fine grooves.

5. A heavy-duty pneumatic radial tire according to claim 3, wherein said independent land area is stepped down relative to a cross-sectional contour line of the tread surface.

6. A heavy-duty pneumatic radial tire according to claim 4, wherein said independent land area is stepped down relative to a cross-sectional contour line of the tread surface.

7. A heavy-duty pneumatic radial tire according to claim 1, wherein said one rubber layer located on the tread surface side includes a shoulder portion of said tread.

8. A heavy-duty pneumatic radial tire according to claim 3, wherein a depth of said fine groove is set to be equal to or smaller than a depth of one of said main grooves and equal to or greater than 60% thereof.

9. A heavy-duty pneumatic radial tire according to claim 4, wherein a depth of said fine groove is set to be equal to or smaller than a depth of one of said main grooves and equal to or greater than 60% thereof.

10. A heavy-duty pneumatic radial tire having a tread comprising:

a first rubber layer and a second rubber layer having mutually different moduli of 300% elasticity at room temperature and said first rubber layer has a smaller modulus of 300% elasticity at room temperature than said second rubber layer, wherein said first rubber layer constitutes an outermost layer, as viewed in a radial direction of said tire, including a tread surface and a shoulder, said first rubber layer is provided with a narrow-width fine groove extending along a circumferential direction of said tire, a radius of curvature of a bottom of said fine groove being 1.5 mm or less, and plural main grooves extending in said first rubber layer along the circumferential direction of said tire, and defining land portions adjacent a groove wall of each of said main grooves, wherein a shortest distance between said bottom of said fine groove and a boundary surface bordering said first rubber layer and said second rubber layer and is set to be within a range of 1 mm and 3 mm and a width of said fine groove is set in a range of not less than 15% and not more than 30% of a width of one of said main grooves.

11. A heavy-duty pneumatic radial tire according to claim 10, wherein one said fine groove is provided within a range of 3–10% of a tread width, said range extending from a tread end.

12. A heavy-duty pneumatic radial tire according to claim 10, wherein said plural main grooves define land portions adjacent a groove wall of each of said main grooves, and said fine groove is provided along one of said land portions, and defines an independent land area formed between said fine groove and said main groove associated therewith.

13. A heavy-duty pneumatic radial tire according to claim 10, wherein said plural main grooves define at least one land portion therebetween, and a pair of fine grooves is provided in at least one land portion, and an independent land area is formed between said pair of fine grooves.

14. A heavy-duty pneumatic radial tire according to claim 12, wherein said independent land area is stepped down relative to a cross-sectional contour line of the tread surface.

15. A heavy-duty pneumatic radial tire according to claim 13, wherein said independent land area is stepped down relative to a cross-sectional contour line of the tread surface.

16. A heavy-duty pneumatic radial tire according to claim 1, wherein said lower layer composes about 30–50% of said tread.

17. A heavy-duty pneumatic radial tire according to claim 10, wherein said second layer composes about 30–50% of said tread.

18. A heavy-duty pneumatic radial tire according to claim 1, wherein the modulus of 300% elasticity of the lower layer is greater than 30 kg/cm$^2$ more than the modulus of 300% elasticity of the upper layer.

19. A heavy-duty pneumatic radial tire according to claim 10, wherein the modulus of 300% elasticity of the second rubber layer is greater than 30 kg/cm$^2$ more than the modulus of 300% elasticity of the first rubber layer.

* * * * *